US007622889B2

United States Patent
Spahn

(10) Patent No.: US 7,622,889 B2
(45) Date of Patent: Nov. 24, 2009

(54) SOLID STATE DETECTOR FOR RECORDING X-RAY IMAGES WITH PHOTOVOLTAIC POWER SUPPLY

(75) Inventor: Martin Spahn, Chicago, IL (US)

(73) Assignee: Siemens Aktiengesellschaft, Munich (DE)

( * ) Notice: Subject to any disclaimer, the term of this patent is extended or adjusted under 35 U.S.C. 154(b) by 332 days.

(21) Appl. No.: 11/450,273

(22) Filed: Jun. 12, 2006

(65) Prior Publication Data

US 2006/0284602 A1   Dec. 21, 2006

(30) Foreign Application Priority Data

Jun. 13, 2005   (DE) .................. 10 2005 027 220

(51) Int. Cl.
*H02J 7/00* (2006.01)
(52) U.S. Cl. ............... 320/101; 320/107; 136/293; 250/370.09; 250/370.1
(58) Field of Classification Search ................ 320/101, 320/107; 250/370.09, 370.1, 370.08, 370.14; 136/291, 293
See application file for complete search history.

(56) References Cited

U.S. PATENT DOCUMENTS

| | | | | |
|---|---|---|---|---|
| 4,280,495 A | * | 7/1981 | Lampert | 604/6.11 |
| 4,285,052 A | * | 8/1981 | Bobbitt | 367/79 |
| 4,310,850 A | * | 1/1982 | Casler, Jr. | 348/141 |
| 4,319,258 A | * | 3/1982 | Harnagel et al. | 257/453 |
| 4,596,266 A | * | 6/1986 | Kinghorn et al. | 137/172 |
| 5,729,587 A | * | 3/1998 | Betz | 378/198 |
| 5,969,501 A | * | 10/1999 | Glidden et al. | 320/101 |
| 6,064,715 A | * | 5/2000 | Sklebitz et al. | 378/37 |
| 6,069,361 A | * | 5/2000 | Rubinstein | 250/370.11 |
| 6,225,711 B1 | * | 5/2001 | Gupta et al. | 307/125 |
| 6,624,350 B2 | * | 9/2003 | Nixon et al. | 136/244 |
| 6,737,573 B2 | * | 5/2004 | Yeh | 136/245 |
| 7,069,124 B1 | * | 6/2006 | Whittaker et al. | 701/28 |
| 2002/0150214 A1 | | 10/2002 | Spahn | |
| 2002/0180404 A1 | * | 12/2002 | Benn et al. | 320/101 |
| 2005/0225281 A1 | * | 10/2005 | Redl | 320/101 |
| 2007/0222410 A1 | * | 9/2007 | Lee | 320/101 |

FOREIGN PATENT DOCUMENTS

DE    101 18 745 C2    10/2002

OTHER PUBLICATIONS

Flachbilddetektoren in der Röntgendiagnostik (M. Spahn, V. Heer, R. Freytag) Zeitschrift Radiologie 43, 2004, Seite 340 bis 350 2004Q16956 DE.

* cited by examiner

*Primary Examiner*—Edward Tso
*Assistant Examiner*—Arun Williams
(74) *Attorney, Agent, or Firm*—Harness, Dickey & Pierce, P.L.C.

(57) ABSTRACT

In order to simplify the usability of solid state detectors, in particular mobile and wireless solid state detectors, a solid state detector is disclosed for recording X-ray images. The detector includes a structurally integrated photovoltaic power supply device. According to one configuration, the solid state detector includes an accumulator and the accumulator is rechargeable by the photovoltaic power supply device, for example by integrated solar cells.

17 Claims, 1 Drawing Sheet

SOLID STATE DETECTOR FOR RECORDING X-RAY IMAGES WITH PHOTOVOLTAIC POWER SUPPLY

The present application hereby claims priority under 35 U.S.C. §119 on German patent application number DE 10 2005 027 220.7 filed Jun. 13, 2005, the entire contents of which is hereby incorporated herein by reference.

FIELD

The invention generally relates to a solid state detector for recording X-ray images.

BACKGROUND

X-ray detectors designed as solid state detectors are known in digital X-ray imaging for recording X-ray images of an object to be studied, in which X-radiation is converted by a scintillator or a direct converter layer into electrical charge and subsequently read out electronically by way of active readout matrices. The image data representing the study results are subsequently transmitted to an evaluation and display device and further processed for the image compilation (article "Flachbilddetektoren in der Röntgendiagnostik" [flat image detectors in X-ray diagnosis] by M. Spahn, V. Heer, R. Freytag, published in Zeitschrift Radiologe 43, 2004, pages 340 to 350).

For example, DE 101 18 745 C2 discloses mobile wireless solid state detectors which have a power supply in the form of a battery or a rechargeable accumulator. In order to charge the accumulator, which is done via a plug connection or an inductive connection, the solid state detector has to be regularly fitted into a charging station and left there for a few hours.

SUMMARY

It is an object of at least one embodiment of the present invention to simplify or improve the usability of such solid state detectors, in particular mobile wireless solid state detectors.

An object may be achieved by a solid state detector.

Owing to the structurally integrated photovoltaic power supply device, the solid state detector according to at least one embodiment of the invention, in particular a mobile and wireless solid state detector, receives a fully autonomized and position-independent power supply which is easy to use, long-lasting and also environmentally friendly. The solid state detector according to at least one embodiment of the invention is independent both of cable connections and battery replacement, or locally and temporally constrained recharging.

According to one refinement of at least one embodiment of the invention, the power supply device includes a rechargeable accumulator. In a way which is advantageous for a particularly simple and reliable independent power supply of the solid state detector, the accumulator is rechargeable by the power supply device. Expediently, the solid state detector includes at least one solar cell. According to a further refinement of at least one embodiment of the invention, a plurality of solar cells are combined to form a solar panel.

BRIEF DESCRIPTION OF THE DRAWINGS

Embodiments of the invention and other example refinements according to features will be explained in more detail below with reference to schematically represented example embodiments in the drawings, without thereby restricting the invention to these example embodiments.

DETAILED DESCRIPTION OF THE EXAMPLE EMBODIMENTS

Figure 1:
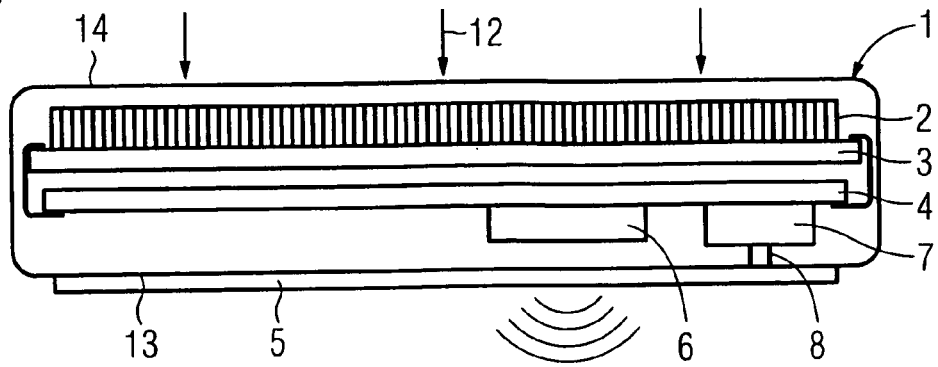
FIG. 1 shows a lateral section through a solid state detector according to at least one embodiment of the invention with a rear-side solar panel.

FIG. 1 shows a mobile and wireless solid state detector 1, the front side 14 of which can be exposed to X-radiation 12 and which according to at least one embodiment of the invention includes a photovoltaic power supply device. In the example embodiment shown, the photovoltaic power supply device contains a solar panel 5 arranged on the rear side 13 of the solid state detector 1. The incident X-radiation 12 is converted by a scintillator 2 into electrical charge and subsequently read out electronically by means of an active photodiode matrix 3. The solid state detector 1 also contains an electronics board 4 and a radio unit 6 for wireless signal and data transmission.

The photovoltaic power supply device also contains a unit for receiving, storing and supplying energy, particularly in the form of an accumulator 7, which in turn includes an electrical connection 8 to the solar panel 5. The solar panel 5 conventionally includes a sizeable number of solar cells connected together, which convert light energy into electrical energy. If the solid state detector 1 is not currently being used to record digital X-ray images, then it will be placed by the user so that scattered light, and in particular sunlight, strikes the solar panel 5. Conversion of the light into energy, and thereby charging of the accumulator 7, therefore takes place.

Figure 2:
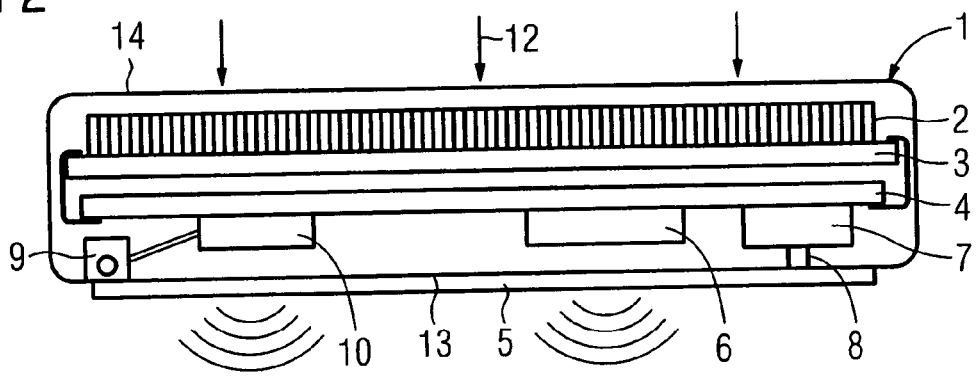
FIG. 2 shows a lateral section through a solid state detector according to at least one embodiment of the invention with a rear-side solar panel and a gravitation sensor.

In order to ensure that regular charging takes place, the solid state detector advantageously includes a position sensor, particularly in the form of a gravitation sensor 9, for determining the position of the solid state detector 1 as shown in FIG. 2. In this context, the position of the solid state detector 1 is intended to mean whether the solid state is placed on its rear side 13 or its front side 14. If the gravitation sensor 9 finds that the rear side 13, on which the solar panel 5 is arranged, lies underneath, then an acoustic signal generator 10 emits a warning tone and informs a user that they should turn the solid state detector 1 over in order to obtain energy. Other sensors may also be provided, for example light sensors.

Figure 3:
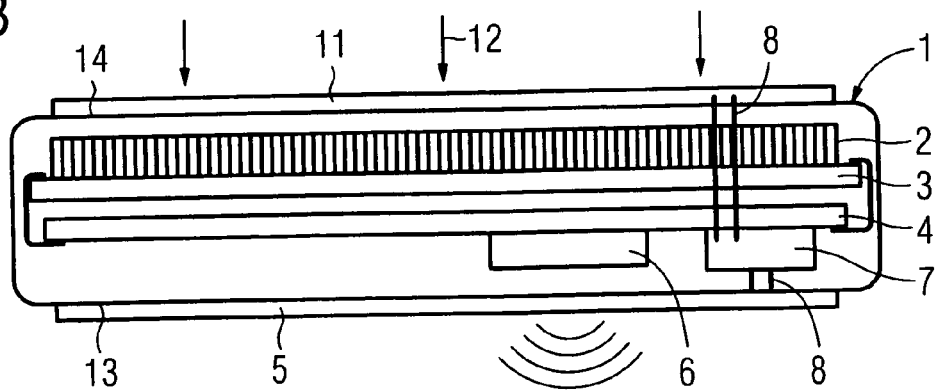
FIG. 3 shows a lateral section through a solid state detector according to at least one embodiment of the invention with a rear-side solar panel and a front-side solar panel.

As another embodiment of the invention, FIG. 3 shows a solid state detector 1 in which a front-side solar panel 11 is arranged on the front side 14. This may be provided in addition or as an alternative to the solar panel 5 on the rear side 13. If it is provided in addition, then energy can be obtained by exposure to light irrespective of the position of the solid state detector 1.

As an alternative, it is also possible to arrange solar cells or further solar panels at other available positions on the solid state detector 1, for example laterally. It is possible to arrange a front-side solar panel 11 above the scintillator 1 since solar cells conventionally consist of materials which insignificantly attenuate X-radiation 12.

The photovoltaic power supply device according to at least one embodiment of the invention may act either alone or as one of a plurality of power supply devices integrated in the solid state detector 1. For example, the accumulator 7 may be chargeable both by a solar panel 5; 11 and by an inductive connection. The appropriate recharging option can be selected, so as to extend the operating time, according to where the solid state detector is located or how often it is used. The solid state detector may additionally be supplied by a battery as an auxiliary measure.

An embodiment of the invention can be briefly summarized as follows: in order to simplify the usability of solid state detectors, in particular mobile and wireless solid state detectors, a solid state detector 1 for recording X-ray images is provided with a structurally integrated photovoltaic power supply device. According to one configuration of at least one embodiment of the invention, the solid state detector 1 includes an accumulator 7 and the accumulator 7 is rechargeable by the photovoltaic power supply device, in particular by integrated solar cells.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A solid state detector to record X-ray images, comprising:
   a photovoltaic power supply device structurally integrated into the solid state detector; and
   a position sensor structurally integrated into the solid state detector, the position sensor being configured to determine an orientation of the photovoltaic power supply device relative to a position of the solid state detector, wherein the power supply device includes a plurality of solar cells, combined to form a solar panel.

2. The solid state detector as claimed in claim 1, wherein the solid state detector is designed as a mobile solid state detector.

3. The solid state detector as claimed in claim 1, wherein the solid state detector is designed as a wireless solid state detector.

4. The solid state detector as claimed in claim 1, wherein the power supply device includes a rechargeable accumulator within the solid state detector.

5. The solid state detector as claimed in claim 4, wherein the accumulator is rechargeable by the photovoltaic power supply device.

6. The solid state detector as claimed in claim 1, wherein the power supply device includes at least one solar cell.

7. The solid state detector as claimed in claim 6, wherein the power supply device includes a plurality of solar cells, combined to form a solar panel.

8. The solid state detector as claimed in claim 7, wherein at least one solar panel is arranged on a rear side of the solid state detector.

9. The solid state detector as claimed in claim 8, wherein at least one solar panel is arranged on a front side of the solid state detector.

10. The solid state detector as claimed in claim 6, wherein at least one solar panel is arranged on a front side of the solid state detector.

11. The solid state detector as claimed in claim 7, wherein at least one solar panel is arranged on a front side of the solid state detector.

12. The solid state detector as claimed in claim 1, wherein at least one solar panel is arranged on a rear side of the solid state detector.

13. The solid state detector as claimed in claim 1, wherein at least one solar panel is arranged on a front side of the solid state detector.

14. The solid state detector as claimed in claim 1, wherein the position sensor comprises a gravitation sensor.

15. The solid state detector as claimed in claim 1, further including an acoustic signal generator configured to emit a tone when the solar panel is not positioned to receive a charge.

16. A solid state detector to record X-ray images, comprising:
   an accumulator structurally integrated into the solid state detector;
   photovoltaic power supply device for recharging the accumulator structurally integrated into the solid state detector; and
   means for determining a position of the solid state detector, the means for determining the position of the solid state detector being configured to determine an orientation of the photovoltaic power supply device relative to the solid state detector, wherein the power supply device includes a plurality of solar cells, combined to form a solar panel.

17. The solid state detector as claimed in claim 16, wherein the photovoltaic power supply device includes at least one integrated solar cell.

* * * * *